United States Patent
Sakamoto et al.

(10) Patent No.: US 8,565,057 B2
(45) Date of Patent: Oct. 22, 2013

(54) MULTILAYER OPTICAL RECORDING MEDIUM

(75) Inventors: Tetsuhiro Sakamoto, Kanagawa (JP); Hirotaka Miyamoto, Kanagawa (JP); Jun Nakano, Tokyo (JP); Kouichi Yasuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/583,883

(22) PCT Filed: Mar. 11, 2011

(86) PCT No.: PCT/JP2011/001429
§ 371 (c)(1),
(2), (4) Date: Sep. 10, 2012

(87) PCT Pub. No.: WO2011/114674
PCT Pub. Date: Sep. 22, 2011

(65) Prior Publication Data
US 2013/0007781 A1  Jan. 3, 2013

(30) Foreign Application Priority Data
Mar. 19, 2010 (JP) .................... 2010-063998

(51) Int. Cl.
*G11B 7/00* (2006.01)

(52) U.S. Cl.
USPC ............... 369/94; 369/103; 720/718

(58) Field of Classification Search
USPC ......... 720/718; 369/94, 283, 103, 272.1, 277, 369/278
See application file for complete search history.

(56) References Cited

U.S. PATENT DOCUMENTS

| | | | |
|---|---|---|---|
| 5,677,903 A * | 10/1997 | Holtslag et al. | 369/112.28 |
| 6,574,174 B1 * | 6/2003 | Amble et al. | 369/44.26 |
| 2002/0024913 A1 * | 2/2002 | Kojima et al. | 369/94 |
| 2003/0133391 A1 * | 7/2003 | Holtslag et al. | 369/94 |
| 2005/0047309 A1 * | 3/2005 | Terao et al. | 369/108 |
| 2006/0203680 A1 * | 9/2006 | Hong et al. | 369/94 |
| 2006/0292492 A1 * | 12/2006 | Ohkubo et al. | 430/270.11 |
| 2007/0014213 A1 * | 1/2007 | Verschuren | 369/47.1 |
| 2009/0263613 A1 * | 10/2009 | Habuta et al. | 428/64.5 |
| 2012/0300601 A1 * | 11/2012 | Saito et al. | 369/44.14 |

FOREIGN PATENT DOCUMENTS

| | | |
|---|---|---|
| JP | 2001-155380 | 6/2001 |
| JP | 2009-104717 | 5/2009 |
| JP | 2009-104718 | 5/2009 |
| JP | 2010-009685 | 1/2010 |
| WO | 2008/015974 | 2/2008 |

* cited by examiner

Primary Examiner — Thomas Alunkal
(74) Attorney, Agent, or Firm — K&L Gates LLP

(57) ABSTRACT

An optical recording medium is provided. The optical recording medium includes a multilayer including an N (N≤5) number of interfaces capable of reflecting incident light.

4 Claims, 7 Drawing Sheets

US 8,565,057 B2

MULTILAYER OPTICAL RECORDING MEDIUM

CROSS REFERENCES TO RELATED APPLICATIONS

The present application is a national stage of International Application No. PCT/JP2011/001429 filed on Mar. 11, 2011 and claims priority to Japanese Patent Application No. 2010-063998 filed on Mar. 19, 2010, the disclosure of which is incorporated herein by reference.

BACKGROUND

The present invention relates to a multilayer optical recording medium including an N (N≤5) number of interfaces capable of reflecting incident light.

For example, optical recording media such as a CD (Compact Disc), a DVD (Digital Versatile Disc), and a BD (Blu-ray Disc: registered trademark) are widely used.

In a recordable optical recording medium including a recording film among such optical recording media, many recording films are provided in order to increase a recording capacity. In particular, in recent years, a multilayer optical recording medium including three or more recording films has been developed.

However, in the case of the multilayer optical recording medium, so-called interlayer stray light is generated and the occurrence of multiple interference becomes a problem. Here, the multiple interference means that, in the multilayer optical recording medium, two different light waves that are reflected on an interface capable of reflecting incident light one or more times interfere with each other, which causes a light intensity change on the detector. This occurs also through an interface including an unrecorded area.

Off course, it is desirable to prevent the occurrence of such multiple interference in order to prevent the reproduction performance from being lowered.

Patent Document 1: Japanese Patent Application Laid-open No. 2010-009685

SUMMARY

Problem to be Solved by the Invention

Here, for example, regarding a three-layer optical recording medium including three recording films, it is possible to prevent the occurrence of the multiple interference by setting the thicknesses of the spacers each formed between the recording films to differ.

That can be understood by assuming a case where, in a three-layer optical recording medium in which the thickness of a spacer between recording films L0 to L1 (L0 is a recording film in a lowermost layer) and the thickness of a spacer between recording films L1 to L2 are the same, the recording film L0 is reproduced. That is, in this case, the optical path length of light (reproduction light: interfered light) that is collected and reflected on the recording film L0 and the optical path length of light (stray light) reflected in an order of the recording film L1→the recording film L2 (lower surface side) →the recording film L1 are the same, and hence the light interferes with each other on the detector and the multiple interference occurs.

Thus, in the case of the three-layer optical recording medium, by setting the thicknesses of the spacers each formed between the recording films to differ as described above, it is possible to set the optical path lengths of the interfered light and the stray light to differ. Therefore, the occurrence of the multiple interference can be prevented.

However, regarding an optical recording medium in which the number of layers are increased, that is, a multilayer optical recording medium including four or more recording films, only by simply setting the thicknesses of the spacers to differ, it is not possible to prevent the occurrence of the multiple interference.

The present invention has been made in the above-mentioned point, and it is an object of the present invention to prevent the reproduction performance of a multilayer optical recording medium including an N (N≥5) number of interfaces capable of reflecting incident light from being lowered due to the multiple interference.

Means for Solving the Problem

Therefore, in the present invention, a multilayer optical recording medium is set to be configured as follows.

Specifically, a multilayer optical recording medium according to the present invention is a multilayer optical recording medium which includes an N (N≥5) number of interfaces capable of reflecting incident light, the multilayer optical recording medium satisfying, provided that each of an M (M≤N) number of interfaces selected from the N number of interfaces is defined as Li (i=0, 1, ..., M, where, it is assumed that as a value of i becomes smaller, the layer in which the interface is formed becomes lower as viewed from an uppermost surface as a light incident surface) and j<k≤l<m≤M is set, when light having a wavelength λ is collected to an objective lens having a numerical aperture NA with an interface Lj being a target, regarding an interface Lk, an interface Lm, and an interface Ll, which cause stray light due to three-times reflections via Lk (or Ll)→Lm→Ll (or Lk), and the interface Lj, condition that a difference $|S_{j\,to\,k} - S_{l\,to\,m}|$ between a total sum $S_{j\,to\,k}$ of a thickness of a spacer formed between the interface Lj and the interface Lk and a total sum $S_{l\,to\,m}$ of a thickness of a spacer formed between the interface Ll and the interface Lm is larger than $n\lambda/NA^2$ (n is a refractive index of the spacer).

Here, the stray light that can cause the multiple interference is light returned to an apparatus side similar to light (interfered light) collected and reflected on an interface (interface Lj) being a reproduction target, and therefore, an odd-times reflected stray light.

At this time, in the multilayer optical recording medium including the N (N≥5) number of interfaces capable of reflecting the incident light, five or more times reflected stray light can be generated as the odd-times reflected stray light. Since the light intensity of the five or more times reflected stray light is attenuated for each reflection on the interface, it can be considered not to be the stray light that can cause the multiple interference which becomes a problem in practice.

Further, out of the stray light, the light that is reflected on the interface formed on the lower layer side of the interface being the reproduction target always has an optical path length larger than interfered light, and hence such stray light can also be excluded from the stray light that can cause the multiple interference which becomes a problem in practice.

In the present invention, based on those points, as described above, regarding the interface Lk, the interface Lm, and the interface Ll, which cause stray light due to three-times reflections via Lk (or Ll)→Lm→Ll (or Lk) (stray light reflected three times on the upper layer side of the interface Lj being the reproduction target), and the interface Lj, the condition that the difference $|S_{j\,to\,k} - S_{l\,to\,m}|$ between the total sum $S_{j\,to\,k}$ of the thickness of the spacer formed between the interface Lj and the interface Lk and the total sum $S_{l\,to\,m}$ of the thickness of the spacer formed between the interface Ll and the interface Lm is larger than $n\lambda/NA^2$ (i.e. the focus depth of the light collected by the objective lens in the recording medium) is set to be satisfied. That is, a difference between the thickness of the spacer through which the interfered light passes and the thickness of the spacer through which the three-times reflected stray light (stray light that may cause multiple interference which becomes problem in practice) passes is set to be larger than the focus depth $n\lambda/NA^2$.

Here, if the difference between the thickness of the spacer through which the interfered light passes and the thickness of the spacer through which the three-times reflected stray light passes is equal to or smaller than the focus depth $n\lambda/NA^2$, the spread of the interfered light and the interference light (three-times reflected light) on the detector can be considered to be almost the same and further the amplitude intensity per unit area is not lowered. Thus, the multiple interference which becomes a problem in practice will occur. In view of this, as described above, by setting the difference between the thickness of the spacer through which the interfered light passes and the thickness of the spacer through which the three-times reflected stray light passes to be larger than the focus depth $n\lambda/NA^2$, it is possible to reduce the amplitude intensity per unit area of the three-reflected stray light on the detector and to prevent the occurrence of the multiple interference which becomes a problem in practice.

Effect of the Invention

As described above, according to the present invention, it is possible to effectively prevent the occurrence of the multiple interference, which becomes a problem in practice, in a multilayer optical recording medium including an N (N≥5) number of interfaces capable of reflecting incident light.

Additional features and advantages are described herein, and will be apparent from the following Detailed Description and the figures.

DETAILED DESCRIPTION

Hereinafter, a best mode for carrying out the invention (hereinafter, referred to as embodiment) will be described.

It should be noted that descriptions will be made in the following order.

<1. Cross-sectional structure and recording/reproduction of multilayer optical recording medium>
<2. Setting of spacer thickness for preventing multiple interference>
<3. Modified example>

1. Cross-Sectional Structure and Recording/Reproduction of Multilayer Optical Recording Medium FIG. 1 is a diagram showing a cross-sectional structure of a multilayer optical recording medium (referred to as multilayer optical recording medium 1) as an embodiment of the present invention.

The multilayer optical recording medium 1 according to this embodiment is a disk-shaped optical recording medium. The multilayer optical recording medium 1 that is rotationally driven is irradiated with laser light for mark recording (information recording). Further, also for reproducing the recorded information, the multilayer optical recording medium 1 that is rotationally driven is irradiated with the laser light.

It should be noted that the optical recording medium is a collective term of recording media that records information recorded/reproduced by laser irradiation.

Figure 1:
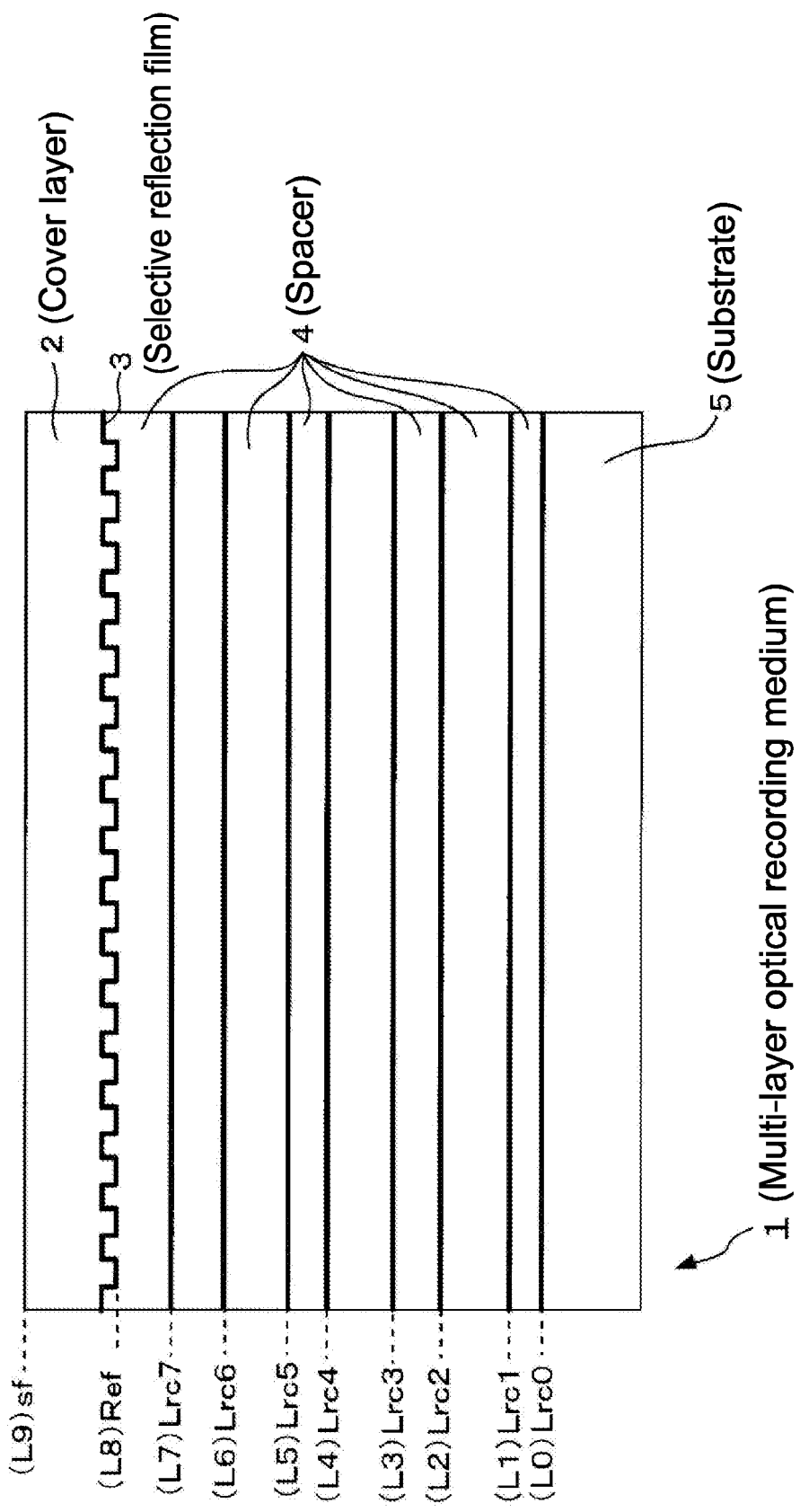
FIG. 1 A diagram showing a cross-sectional structure of a multilayer optical recording medium according to an embodiment.

As shown in FIG. 1, in the bulk recording medium 1, a cover layer 2 and a selective reflection film 3 are formed in the stated order from an upper layer side. Further, on a lower layer side, a recording layer is formed having such a structure that spacers 4 and recording films Lrc are repeatedly laminated. On the lower layer side thereof, a substrate 5 is formed.

Here, in the present specification, the "upper layer side" means an upper layer side as a surface to which the light for recording/reproduction of information is input is set as an upper surface.

In the multilayer optical recording medium 1, the cover layer 2 is made of, for example, a polycarbonate resin or an acrylic resin. As shown in the figure, on the lower surface side, as a position guide element for guiding a recording/reproduction position, a guide groove is formed by formation of a groove, a pit row, etc. so that the lower surface side has a concavo-convex shape in cross-section. The guide groove is formed in a spiral or concentric form.

For example, when the guide groove is formed of the pit row, by a combination of pit and land lengths, position information (absolute position information: rotation angle information representing a rotation angle position on a disk, radius position information, etc.) is recorded. Alternatively, when the guide groove is formed of the groove, by forming the groove to periodically wobble, the position information is recorded by periodical information of the wobbling.

The cover layer 2 is formed by, for example, injection molding using a stamper in which such a guide groove (concavo-convex shape) is formed.

Further, on the lower surface side of the cover layer 2 in which the pit row is formed, the selective reflection film 3 is formed.

The selective reflection film 3 will be described later.

As described above, on the lower layer side of the selective reflection film 3, the recording layer is formed.

In the recording layer, the spacers 4 are made of, for example, an adhesive material such as an ultraviolet curable resin.

Further, on the recording films Lrc, marks are formed by collection of the laser light, and then the recording films Lrc become films capable of reflecting incident light. For example, the recording films Lrc in this case are formed by laminating recording materials such as a phase change film and a pigment change film on the reflection film.

It should be noted that in the case of a recording method in which portions having a reflectivity lowered by, for example, burning off the reflection film are set as mark portions, the recording films Lrc can be made of only reflective material. However, also in such a case, the recording films Lrc are still capable of reflecting the incident light.

In this embodiment, in the recording layer, the eight recording films Lrc (Lrc0 to Lrc7) are formed. At this time, for the recording film Lrc 0 formed in the lowermost layer, a total-reflecting recording film configured to totally reflect the incident light is used. For the recording films Lrc 1 to Lrc7 except for the recording film Lrc 0, semi-transparent recording films configured to transmit therethrough a part of the incident light are used.

Further, the substrate 5 is made of, for example, a polycarbonate resin or an acrylic resin.

The multilayer optical recording medium 1 having the structure as shown in FIG. 1 can be manufactured by the following process, for example.

First, on the substrate 5, the total-reflecting recording film as the recording film Lrc 0 is formed. Then, on the recording film Lrc 0, repeated laminating of the spacer 4→the semi-transparent recording film is performed until the recording film Lrc 7 is formed.

On the other hand, the cover layer 2 provided with the concavo-convex shape in cross-section due to the formation of the position guide elements by, for example, injection molding using the stamper described above is formed. Then, the selective reflection film 3 is formed on a surface side of the cover layer 2 provided with the concavo-convex shape in cross-section.

The cover layer 2 on which the selective reflection film 3 is thus formed is bonded to the upper surface of the recording film Lrc 7 with the surface on which the selective reflection film 3 is formed being opposed to it. Here, bonding is performed using an ultraviolet curable resin for the spacer. Specifically, for example, by applying an ultraviolet curable resin onto the recording film Lrc 7 by, for example, a spin coating method, and then irradiating it with ultraviolet light in such a state that the surface of the cover layer 2, on which the selective reflection film 3 is formed, abuts against the recording film Lrc 7, the selective reflection film 3 and the recording film Lrc 7 sandwich the spacer 4 as shown in the figure.

Here, in the multilayer optical recording medium 1 described above, it is notable that the recording films Lrc have no position guide elements.

That is, although, in a two-layer disk or the like currently in widespread use, the position guide element is formed for each recording film, in the multilayer optical recording medium 1 of this example, one position guide element is formed at a position in a layer different from the recording layer.

With this structure, unlike the case where the position guide element is formed for each recording film Lrc, it is possible to overcome a problem that along with an increase of the recording films Lrc, formation processes for the position guide elements also increase. Therefore, as the number of layers of the multilayer structure is increased, it becomes more advantageous in terms of simplification of the manufacturing process and reduction of the manufacturing cost.

It should be noted that in the case where the position guide element is formed in a single layer as described above, only by simply emitting the laser light for recording/reproduction (hereinafter, also referred to as recording/reproduction laser light) through an objective lens, it is impossible to record a mark at a predetermined position upon recording on each recording film Lrc.

Figure 2:
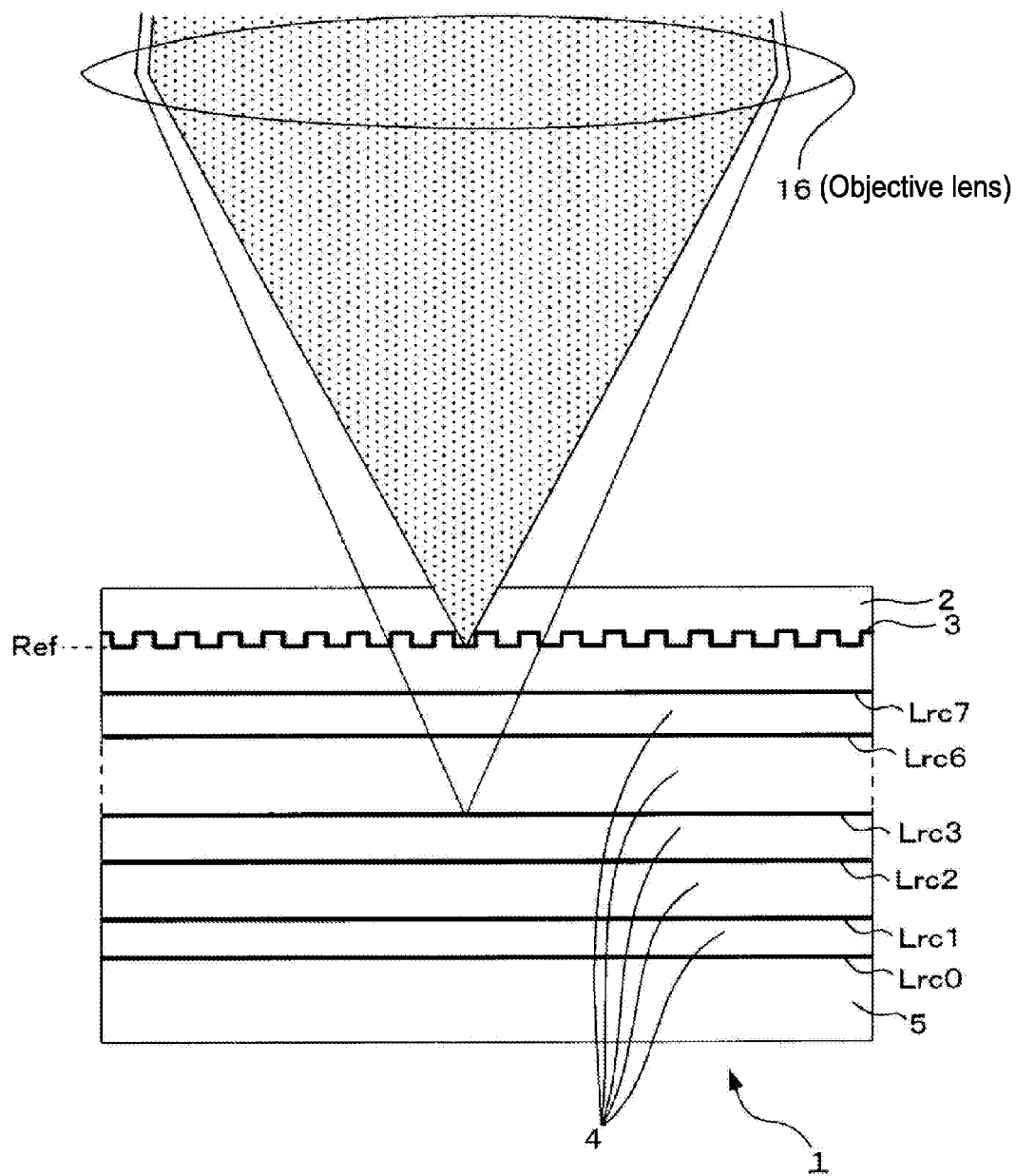
FIG. 2 A diagram for describing an example of a servo control of the multilayer optical recording medium according to the embodiment.

In view of this, regarding the multilayer optical recording medium 1 having the structure as shown in FIG. 1, as shown in next FIG. 2, together with the recording/reproduction laser light, servo laser light as laser light for a position control is set to be separately emitted through a common objective lens 16.

At this time, if the servo laser light arrives at the recording film Lrc, there is a fear that it may adversely affect the mark recording. Therefore, as the servo laser light, the laser light having a wavelength band different from the recording/reproduction laser light is used. Further, as the reflection film on which the position guide element is to be formed, the selective reflection film 3 having a wavelength selectivity of reflecting the servo laser light (light having predetermined wavelength band) and transmitting therethrough the recording/reproduction laser light (light having wavelength other than predetermined wavelength band).

Under such assumption, an example of the servo control of the multilayer optical recording medium 1 will be described.

First, regarding a tracking servo control, different methods are adopted upon recording and reproduction.

Specifically, upon recording when the mark is not formed yet, the tracking servo cannot be applied based on the reflected light of the recording/reproduction laser light from the recording film Lrc, and hence the tracking servo control of the objective lens 16 upon recording is performed based on the reflected light of the servo laser light from the selective reflection film 3 in such a manner that the spot position of the servo laser light follows the position guide element.

Accordingly, even when each recording film Lrc has no position guide elements, a mark can be recorded at a predetermined position on the recording film Lrc (position directly beneath a track serving as the position guide element).

On the other hand, upon reproduction when the mark row has already been formed in the recording film Lrc, the tracking servo can be applied using the recorded mark row as a target. Therefore, upon reproduction, based on the reflected light of the recording/reproduction laser light from the recording film Lrc, in such a manner that the spot position of the recording/reproduction laser light follows the recorded mark array, the tracking servo control of the objective lens 16 is performed.

Here, as it will be appreciated also from the above description, the surface on which the selective reflection film 3 is formed having the position guide element becomes a reflection surface to be a reference for the position control of the recording/reproduction laser light based on the servo laser light. In view of this, hereinafter, the surface on which the selective reflection film 3 is formed will be referred to as a reference surface Ref.

Further, regarding a focus servo control, the following points should be noted.

Here, upon recording, in order to perform the tracking servo control of the objective lens 17 based on the position guide element formed in the reference surface Ref as described above, the servo laser light needs to be focused on the reference surface Ref. Further, off course, upon recording, the recording/reproduction laser light needs to be focused on the recording film Lrc being a recording target.

As described above, upon recording, it is necessary to separately applying the focus servo to the recording/reproduction laser light and the servo laser light using different layer positions as targets. In view of this point, an apparatus that performs recording/reproduction of the multilayer optical recording medium 1 is provided with, in addition to a biaxial actuator that performs the position control of the objective lens 16, a recording/reproduction light focus mechanism for independently controlling the focus position of the recording/reproduction laser light.

Figure 3:
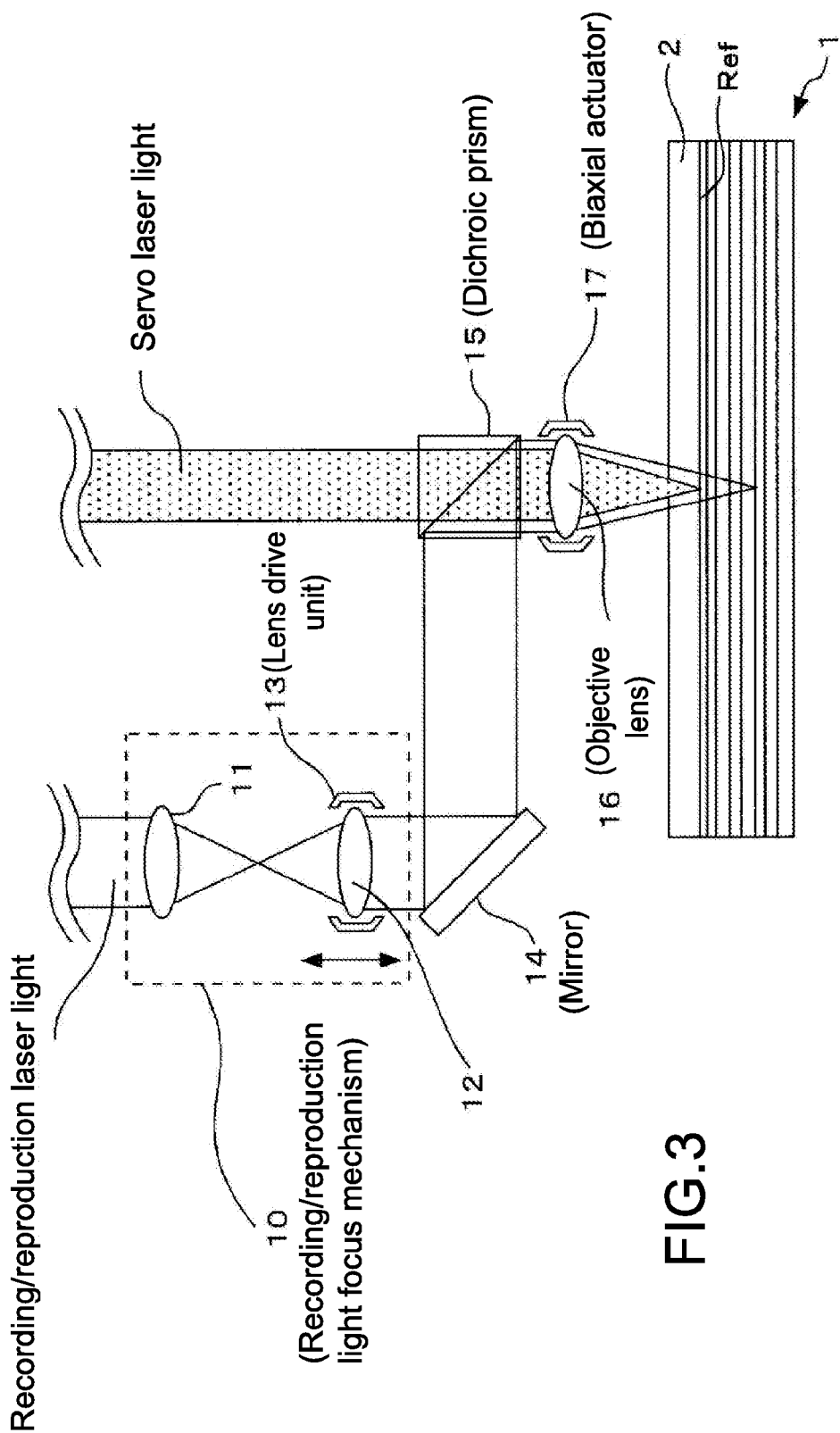
FIG. 3 A diagram showing the outline of optical systems for performing recording/reproduction of the multilayer optical recording medium according to the embodiment.

Here, the outline of optical systems for performing recording/reproduction of the multilayer optical recording medium 1 including the mechanism for independently controlling the focus position of the laser light for the recording/reproduction light is shown in FIG. 3.

In FIG. 3, the objective lens 16 as also shown in FIG. 2 is held to be displaceable by the biaxial actuator 17 shown in the figure in a radius direction (tracking direction) of the multilayer optical recording medium 1 and a direction (focus direction) in which it moves closer to and away from the multilayer optical recording medium 1.

As shown in FIG. 3, a recording/reproduction light focus mechanism 10 for independently controlling the focus position of the recording/reproduction laser light includes a fixed lens 11, a movable lens 12, and a lens drive unit 13. The lens drive unit 13 displaces, based on a driving signal from a control unit (not shown), the movable lens 12 in a direction parallel to an optical axis of the recording/reproduction laser light. In this manner, by driving the movable lens 12 in the direction parallel to the optical axis of the recording/reproduction laser light, the collimation of the recording/reproduction laser light incident upon the objective lens 16 is changed so that the focus position of the recording/reproduction laser light can be changed independently of the servo laser light.

Further, as described above, the recording/reproduction laser light and the servo laser light have the different wavelength bands. Thus, correspondingly, in the optical systems in this case, a dichroic prism 15 in the figure is provided to separate reflected light of the recording/reproduction laser light and the servo laser light from the multilayer optical recording medium 1 into individual systems (i.e. each reflected light detection can be independently performed).

Further, considering outward light, the dichroic prism 15 has a function of combining the recording/reproduction laser light and the servo laser light with each other on a single axis to input into the objective lens 16. Specifically, in this case, as shown in the figure, after reflected by a mirror 14 through the recording/reproduction light focus mechanism 10 (fixed lens 11→movable lens 12), the recording/reproduction laser light is reflected by the selective reflection surface of the dichroic prism 15 and inputs into the objective lens 16. On the other hand, the servo laser light transmits through the selective reflection surface of the dichroic prism 15 and inputs into the objective lens 16.

With the configuration of the optical systems as described above, the focus servo control is performed in the following manner.

Specifically, the focus servo control of the objective lens 16 based on the reflected light of the servo laser light is performed so that the focus position of the servo laser light follows the reference surface Ref. In addition, the focus servo control of the recording/reproduction light focus mechanism 10 (lens drive unit 13) based on the reflected light of the recording/reproduction laser light is performed so that the focus position of the recording/reproduction laser light follows the recording film Lrc being a recording target.

It should be noted that, as described above, the tracking servo control upon reproduction is performed by driving the objective lens 16 based on the reflected light of the recording/reproduction laser light using the recorded mark row as a target, and hence, upon reproduction, it is unnecessary to focus the servo laser light onto the reference surface Ref. In view of this point, it is also possible to perform the focus servo control of the objective lens 16 upon reproduction in accordance with the reflected light of the recording/reproduction laser light. In this case, the recording/reproduction light focus mechanism 10 only needs to be used for roughly selecting the recording film Lrc, that is, for roughly moving the focus position of the recording/reproduction laser light.

Reference will be made back to FIG. 1.

The multilayer optical recording medium 1 shown in FIG. 1 includes, as the interfaces Li capable of reflecting incident light, the ten interfaces L0 to L9 as shown in the brackets in the figure. That is, the multilayer optical recording medium 1 shown in FIG. 1 includes, as the interfaces capable of reflecting the incident light, the N=10 number of interfaces.

In the present specification, the "interfaces capable of reflecting the incident light" also include interfaces of media having different refractive indexes in addition to those having thin films that reflect light. Therefore, a surface sf of the multilayer optical recording medium 1 is also included in the interface Li.

2. Setting of Spacer Thickness for Preventing Multiple Interference

Here, in this embodiment, in order to prevent the occurrence of the multiple interference which becomes a problem in practice, the thickness of a layer (spacer) between the interfaces capable of reflecting the incident light is set.

Hereinafter, first referring to FIG. 4, condition for preventing the occurrence of the multiple interference which becomes a problem in practice will be discussed.

It should be noted that in the description below, the following definitions will be made.

First, each interface capable of reflecting the incident light is defined as Li (i=0, 1, . . . , N). Here, it is assumed that as the value of i becomes smaller, the layer in which the interface is formed becomes lower.

Further, the thickness of the layer (thickness of spacer) formed between the interface Li−1 and the interface Li is defined as Si (i=0, 1, . . . , N).

Under such assumption, FIG. 4 will be described.

Figure 4:
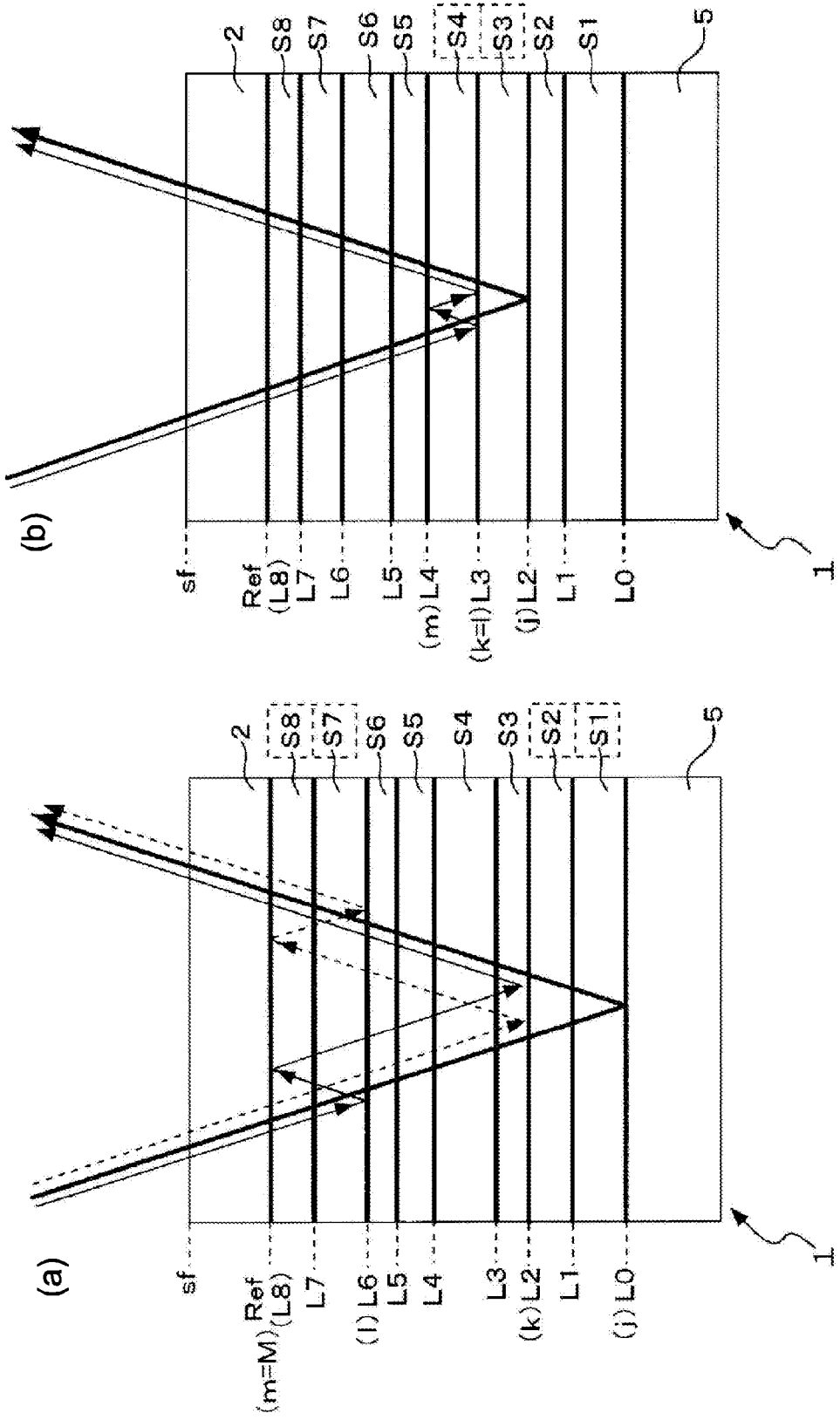
FIG. 4 Diagrams for discussing condition for preventing the occurrence of multiple interference which becomes a problem in practice.

In FIG. 4, FIG. 4(*a*) illustrates stray light (interference light) that causes multiple interference that occurs upon reproduction with the interface L0 (recording film Lrc 0) being a target in the case where a sum (S7+S8) of a spacer thickness S7 between the interface L6 (recording film Lrc 6) and the interface L7 (recording film Lrc 7) and a spacer thickness S8 between the interface L7 and the interface L8 (reference surface Ref) in the multilayer optical recording medium 1 is equal to a sum (S1+S2) of a spacer thickness S1 between the interface L0 (recording film Lrc 0) and the interface L1 (recording film Lrc 1) and a spacer thickness S2 between the interface L1 and the interface L2 (recording film Lrc 2).

Further, FIG. 4(*b*) illustrates the interference light that is generated upon reproduction with the interface L2 being a target in the case where a spacer thickness S3 between the interface L2 (recording film Lrc 2) and the interface L3 (recording film Lrc 3) is equal to a spacer thickness S4 between the interface L3 and the interface L4 (recording film Lrc 4).

It should be noted that, in FIG. 4, the solid line arrow represents light (referred to as interfered light) that is collected and reflected on the interface Li being a reproduction target, and the thin line arrow (thin solid line and thin dashed line in FIG. 4(*a*)) represents interference light that causes the multiple interference.

First, as an assumption, in order to derive the condition for preventing the occurrence of the multiple interference which becomes a problem in practice, it is necessary to define a layer range that causes the interference light. Specifically, in the case of the multilayer optical recording medium 1 having the cross-sectional structure as shown in FIG. 1, it is necessary to define whether or not to include the reference surface Ref and the surface sf in the target layer range.

Here, as described above, the reference surface Ref (selective reflection film 3) is configured to transmit therethrough the recording/reproduction laser light (light collected on recording film Lrc) for performing recording/reproduction on the recording film Lrc and to reflect the servo laser light. However, in current state, it is very difficult to set the wavelength selectivity of the selective reflection film 3 to 100%, and hence, in practice, the recording/reproduction laser light is slightly reflected on the selective reflection film 3.

In view of this point, in this embodiment, the reference surface Ref is also included in the target layer range.

Further, the light intensity of a reflected light component on the surface sf is very small in absolute term. However, for example, in the case where about dozens of recording films Lrc are formed, as the layer in which the recording film Lrc is formed becomes lower, a relative light intensity difference between the reflected light of the recording film Lrc and the reflected light of the surface sf becomes smaller. Therefore, for preventing the occurrence of the multiple interference, the stray light via the surface sf becomes much more likely to be unignorable.

In the multilayer optical recording medium 1 of this example in which the number of recording films Lrc is eight, the light intensity of the reflected light of the recording film Lrc 0 in the lowermost layer is set to be sufficiently high in comparison with the light intensity of the stray light via the surface sf. Thus, in this example, the surface sf is excluded from the layer range to consider in setting the spacer thickness for preventing the multiple interference.

In view of the above-mentioned point, in this example, among an N number of interfaces capable of reflecting the incident light that are formed in the multilayer optical recording medium 1, an N−1=M number of interfaces are selected excluding only the surface sf, and the M number of interfaces are defined as the interfaces to consider in preventing the occurrence of the multiple interference which becomes a problem in practice.

Reference will be made back to FIG. 4.

First, in order to prevent the occurrence of the multiple interference which becomes a problem in practice, three-times reflected stray light only needs to be considered.

That is, although the stray light that can cause the multiple interference is always odd-times reflected light, regarding five or more-times reflected stray light of the odd-times reflected light, its light intensity is attenuated for each reflection on the interface, and hence, on a detector for obtaining a reproduction signal, the five or more-times reflected stray light can be considered not to have a light intensity that can cause the multiple interference which becomes a problem in practice. Therefore, in view of this point, for preventing the occurrence of the multiple interference which becomes a problem in practice, only the three-times reflected stray light will be considered.

Further, the stray light via the interface formed on the lower layer side of the interface being a reproduction target always has an optical path length larger than the interfered light. Therefore, even in the case where it is the three-times reflected stray light, if it is the stray light via the interface on the lower layer side of the interface being the reproduction target as described above, it can be excluded from the stray light that can cause the multiple interference which becomes a problem in practice.

As will be appreciated also from those points, in order to prevent the occurrence of the multiple interference which becomes a problem in practice, it is sufficient to set the spacer thickness S between the interfaces so that the optical path lengths of all the three-times reflected stray light via the interface on the upper layer side of the interface being the reproduction target (hereinafter, referred to as interface Lj) at least do not correspond to the optical path length of the interfered light.

Now, the three-times reflected stray light which becomes a problem in practice will be specifically discussed.

First, in the case of FIG. 4($a$), the corresponding stray light is stray light (thin solid line arrow) that is reflected on the interface L6→the interface L8→the interface L2 and stray light (thin dashed line arrow) that is reflected on the interface L2→the interface L8→the interface L6 as shown in the figure.

In the case of FIG. 4($a$), the interface Lj being the reproduction target is set to the interface L0 and the spacer thickness is S1+S2=S7+S8, and hence the optical path lengths of the two three-times reflected stray light beams are equal to the optical path length of the interfered light. Thus, the multiple interference will occur.

At this time, by denoting the interfaces through which the three-times reflected stray light passes by Lk, Ll, and Lm in the stated order from the lower layer side, the three-times reflected stray light in the case of FIG. 4($a$) can be expressed as one that passes and generates through the three interfaces Lk (or Ll)→Lm→Ll (or Lk).

On the other hand, as in the case of FIG. 4($b$), in the case where intervals between three consecutive interfaces Li−1, Li, and Li+1 are equal to each other (i.e. the spacer thicknesses Si and Si+1 between the three interfaces Li−1, Li, and Li+1 are equal to each other), in order to perform reproduction with the interface Li−1 on the lowermost layer side among the three interfaces Li−1, Li, and Li+1 being a target, stray light (via Li→Li+1→Li), which is reflected three times between the two interfaces of the interface Li and the interface Li+1, can also be generated as the stray light that can cause the multiple interference which becomes a problem in practice.

That is, in order to prevent the occurrence of the multiple interference which becomes a problem in practice, considering that such three-times reflected stray light via Li→Li+1→Li can also be generated, each spacer thickness should be set.

Here, as in the case of FIG. 4($b$), the three-times reflected stray light via the two interfaces L can be construed as being generated when the interface Lk and the interface Ll are the same, applying this case to the case of FIG. 4($a$) in which the three-times reflected stray light passes through three different interfaces "Lk (or Ll)→Lm→Ll (or Lk)."

Based on this point, in the present specification, an inclusive expression of both of the three-times reflected stray light via three interfaces as shown in FIG. 4($a$) and the three-times reflected stray light only via the two interfaces as shown in FIG. 4($b$) that serve as the stray light to consider in preventing the multiple interference which becomes a problem in practice is as follows.

That is, provided that "k≤l<m," it is expressed by "the three-times reflected stray light via Lk (or Ll)→Lm→Ll (or Lk)."

Provided that "k≤l<m" as described above, the "three-times reflected stray light via Lk (or Ll)→Lm→Ll (or Lk)" also includes the three-times reflected stray light via Lk→Lm→Lk and therefore also includes the stray light reflected three times between the two interfaces as in the case of FIG. 4(b).

At this time, the three-times reflected stray light to consider in preventing the occurrence of the multiple interference which becomes a problem in practice is only the stray light via the interface L on the upper layer side of the interface Lj being the reproduction target as described above. Therefore, also considering this point, the following is set:

"j<k≤l<m."

Further, as described above, in this example, the surface sf is excluded from the interface to consider in preventing the occurrence of the multiple interference which becomes a problem in practice and the N−1=M number of interfaces L are selected. In view of this point, the target layer range to consider in preventing the occurrence of the multiple interference which becomes a problem in practice in the case of this example can be expressed by "j<k≤l<m≤M."

Here, when the three-times reflected stray light to consider in preventing the occurrence of the multiple interference which becomes a problem in practice, that is, the three-times reflected stray light via the interface on the upper layer side of the interface Lj being the reproduction target is expressed by the "three-times reflected stray light via Lk (or Ll)→Lm→Ll (or Lk)" setting "j<k≤l<m" as described above, a total sum of the spacer thickness between the interfaces formed between the interface Lj and the interface Lk is expressed by "$S_{j\ to\ k}$." Further, a total sum of the spacer thickness between the interfaces formed between the interface Ll and the interface Lm is expressed by "$S_{l\ to\ m}$."

At this time, provided that a difference $S_{j\ to\ k} - S_{l\ to\ m}$ (absolute value) between these $S_{j\ to\ k}$ and $S_{l\ to\ m}$ is zero (i.e. state shown in FIG. 4(a) or FIG. 4(b)), there is no difference between the optical path length of the "three-times reflected stray light via Lk (or Ll)→Lm→Ll (or Lk)" and the optical path length of the interfered light via the interface Lj. Thus, the multiple interference which becomes a problem in practice will occur.

Further, even if there is a difference between $S_{j\ to\ k}$ and $S_{l\ to\ m}$, as long as this difference is equal to or smaller than the depth of focus of the recording/reproduction laser light in the multilayer optical recording medium 1, the spread of the interfered light and the interference light on the detector can be considered to be almost the same and further the amplitude intensity per unit area is not lowered. Thus, the multiple interference which becomes a problem in practice will occur.

In view of this, in this embodiment, the difference between $S_{j\ to\ k}$ and $S_{l\ to\ m}$ is set to be larger than the focus depth of the recording/reproduction laser light in the multilayer optical recording medium 1. In other words, the difference between the total thickness of the spacers through which the interfered light reflected by the interface Lj transmits and the total thickness of the spacers through which the three-times reflected stray light via the interface on the upper layer side of the interface Lj transmits is set to be larger than the focus depth.

With this setting, the amplitude intensity per unit area of the three-times reflected stray light on the detector can be lowered with the result that the occurrence of the multiple interference which becomes a problem in practice can be prevented.

It should be noted that where the numerical aperture of the objective lens 16 (numerical aperture for recording/reproduction laser light) is denoted by NA, the wavelength of the recording/reproduction laser light is denoted by λ, and the refractive index of the spacer formed between the interfaces is denoted by n, the focus depth of the recording/reproduction laser light in the multilayer optical recording medium 1 is expressed by "$n\lambda/NA^2$."

In view of this, for preventing the occurrence of the multiple interference which becomes a problem in practice, the spacer thickness between the interfaces from the interface L0 to the interface LM only needs to be set so that the following condition is at least satisfied:

$|S_{j\ to\ k} - S_{l\ to\ m}| > n\lambda/NA^2$      (Expression 1).

For example, in the case of this example, where NA=0.85, λ=0.405 nm, and n=1.6, $n\lambda/NA^2$=0.9 μm is established. Therefore, $|S_{j\ to\ k} - S_{l\ to\ m}|$ only needs to be set to be larger than about 1 μm.

As will be appreciated from the above description, in order to prevent the occurrence of the multiple interference which becomes a problem in practice with respect to the multilayer optical recording medium including an N (N≤5) number of interfaces capable of reflecting the incident light, it is a minimum requirement to set the spacer thickness between the interfaces to at least satisfy the condition of the above (Expression 1) with respect to an M number of interfaces selected among the N number of interfaces.

Here, in order to prevent the occurrence of the multiple interference which becomes a problem in practice, it is also possible to focus on a difference between arbitrary two spacer thicknesses among the spacer thicknesses between the interfaces of the M number of selected interfaces (L0 to LM).

That is, where the arbitrary two spacer thicknesses among the spacer thicknesses between the interfaces of the M number of selected interfaces are denoted by a spacer thickness Sa and a spacer thickness Sb (1≤a≠b≤M), if the difference between the spacer thicknesses Sa and Sb is larger than the above-mentioned focus depth, the multiple interference which becomes a problem in practice will not occur.

In view of this, in this embodiment, as setting of the spacer thickness that satisfies the condition of the above (Expression 1), the following setting is specifically performed. That is, provided that the difference between the spacer thicknesses Sa and Sb is expressed by |Sa−Sb|, each spacer thickness is set to satisfy the following condition:

$|Sa - Sb| > n\lambda/NA^2$      (Expression 2).

Here, when the condition of the above (Expression 2) is satisfied, a total thickness of the recording layer Stot (i.e. thickness in the layer range from the recording film Lrc0 to the recording film Lrc8) can be expressed as follows. That is, where the total number of interfaces (recording films Lrc) in the recording layer is denoted by X, the thickness of each spacer formed between the interfaces is denoted by Si, and the minimum value of the thickness Si is denoted by Smin, the following is established:

$Stot > Smin \times (X-1) + (n\lambda/NA^2) \times (X-2) \, 2/2$      (Expression 3).

This is derived from "$(n\lambda/NA^2) \times (X-1) \, 2/2$" that expresses the area of a triangle formed when a bar graph in which bars indicating the thickness Si of an X−1 number of spacers formed in the recording layer are arranged in an increase order of the Si value is generated.

At this time, when the total spacer thickness is excessively large, it becomes very difficult to suitably perform spherical aberration correction upon recording/reproduction with each recording film being a target. Therefore, it is desirable that Stot denoting the total spacer thickness be as small as possible while satisfying (Expression 3).

Figure 5:
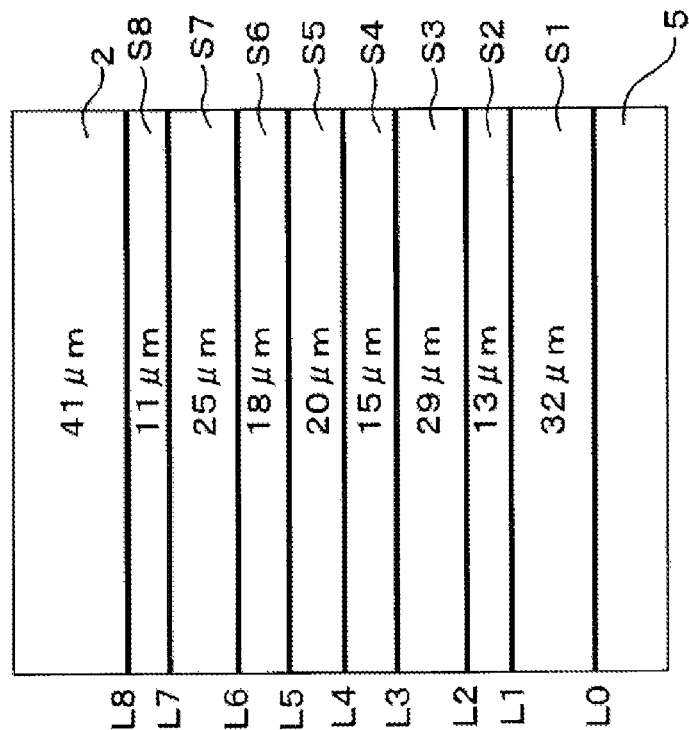
FIG. 5 Diagrams showing a setting example of the thicknesses of spacers of the multilayer optical recording medium according to the embodiment and simulation results of a change in light intensity due to interference for each recording film being a reproduction target.

FIG. 5 show a setting example of the thickness of each spacer of the multilayer optical recording medium 1, which is designed to satisfy (Expression 1) and (Expression 2) described above (FIG. 5(a)), and simulation results of a change in light intensity due to interference for each of the recording films Lrc being reproduction targets (in this case, the interfaces L0 to L7) (FIG. 5(b)).

Figure 6:
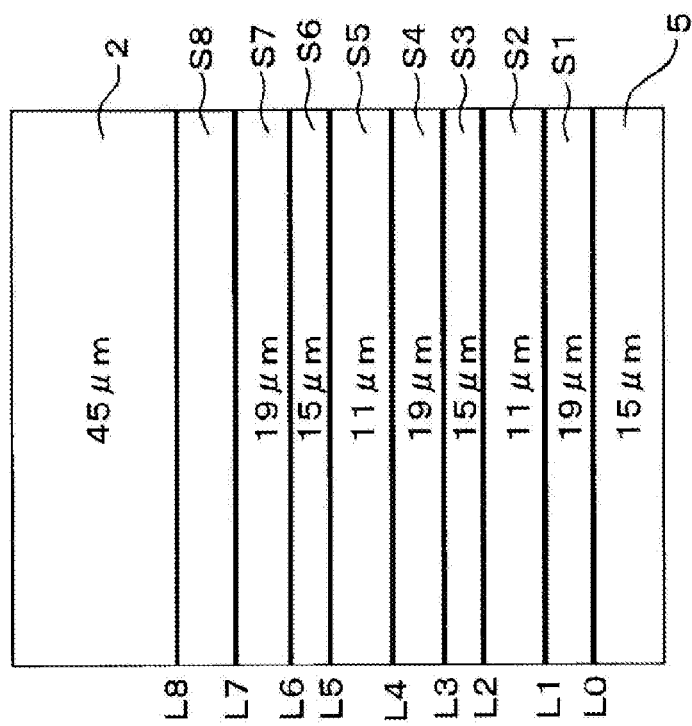
FIG. 6 Diagrams showing a setting example of the thicknesses of spacers of a multilayer optical recording medium that does not satisfy the condition as the embodiment and simulation results of a change in light intensity due to interference for each recording film being a reproduction target.

Further, as a comparison, FIG. 6 show a setting example of the thickness of each spacer in the case where each space thickness is set without considering either of (Expression 1) and (Expression 2) (FIG. 6(a)) and simulation results of a change in light intensity due to interference for each of the recording films Lrc being reproduction targets.

First, in the example of FIG. 6(a), regarding each spacer thickness Si, S1=15 µm, S2=19 µm, S3=11 µm, S4=15 µm, S5=19 µm, S6=11 µm, S7=15 µm, and S8=19 µm are set. Further, the cover layer 2 has a thickness of 45 µm.

Referring to FIG. 6(b), in the case of the setting of the spacer thickness shown in FIG. 6(a), upon reproduction on the upper layer side, for example, the interfaces L7 and L6 (recording films Lrc 7 and Lrc6), the change in the light intensity due to the interference is prevented. However, a relatively large light intensity change is caused upon reproduction of the lower layer side thereof, and the light intensity change tends to increase as the layer in which the recording film Lrc being the reproduction target is formed becomes lower.

In contrast, in this example, as the setting of each spacer thickness Si that satisfies the conditions of (Expression 1) and (Expression 2), as shown in FIG. 5(a), S1=32 µm, S2=13 µm, S3=29 µm, S4=15 µm, S5=20 µm, S6=18 µm, S7=25 µm, and S8=11 µm are set. It should be noted that the cover layer 2 has a thickness of 41 µm.

By the setting of the spacer thickness to satisfy such conditions of (Expression 1) and (Expression 2), as seen from the results of FIG. 5(b), in each recording film Lrc, the occurrence of the light intensity change due to the interference can be prevented. That is, as seen also from this results, by the setting of the spacer thickness as this embodiment, the occurrence of the multiple interference which becomes a problem in practice can be prevented.

3. Modified Example

Hereinabove, the embodiment of the present invention has been described. However, the present invention should not be limited to the specific example described above.

For example, in the above description, the setting of each spacer thickness for preventing the occurrence of the multiple interference is performed excluding the three-times reflected stray light via the surface sf (i.e. M=N−1). Off course, however, the setting of the spacer thickness for preventing the occurrence of the multiple interference may be performed also considering the three-times reflected stray light via the surface sf (i.e. M=N).

Alternatively, in the case where the three-times reflected stray light via the reference surface Ref can be excluded because the wavelength selectivity of the selective reflection film 3 is almost 100%, the setting of the spacer thickness for preventing the occurrence of the multiple interference may be performed without considering the three-times reflected stray light via the reference surface Ref.

Further, in the above description, although the case where the number of recording films Lrc is eight has been illustrated, the number of recording films Lrc is not limited thereto.

Figure 7:
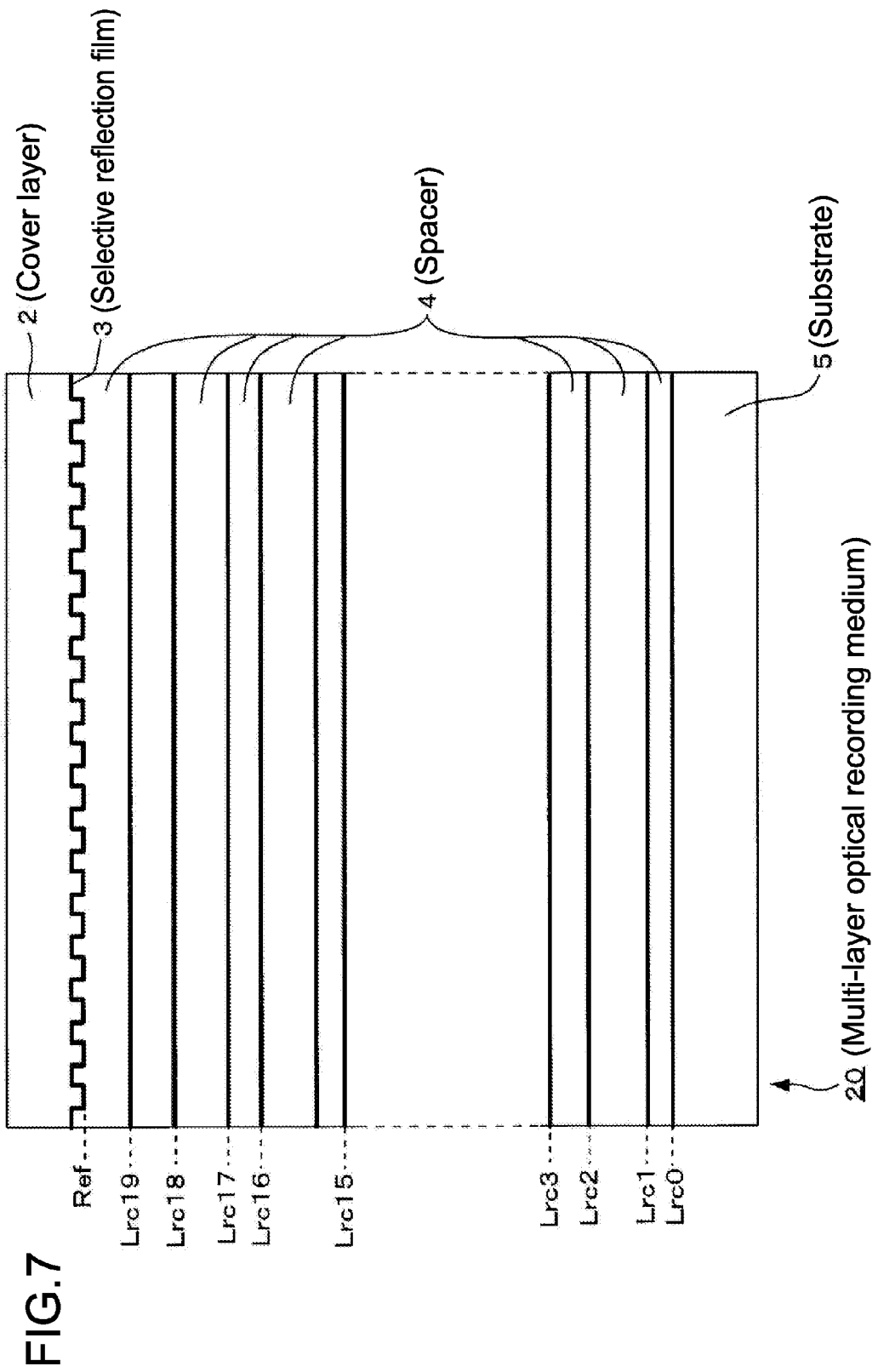
FIG. 7 A diagram showing a cross-sectional structure of a multilayer optical recording medium as a modified example.

FIG. 7 shows, for example, a cross-sectional structure of a multilayer optical recording medium 20 when the number of recording films Lrc is set to 20. As shown in the figure, as the multilayer optical recording medium 20, from a recording film Lrc 0 in a lowermost layer formed on a substrate 5 to a recording films Lrc 19 in an uppermost layer which is bonded to a selective reflection film 3 via a spacer 4, total 20 recording films Lrc are formed to sandwich the spacer 4 between the recording films Lrc.

Further, also other points than the number of recording films Lrc should not be limited to those illustrated in the above. Regarding the structure of the multilayer optical recording medium, a suitable structure only needs to be appropriately adopted depending on an actual embodiment.

For example, a structure in which a position guide element such as a groove is formed in each recording film Lrc may be adopted. In such a case, the reference surface Ref (selective reflection film 3) can be omitted.

The multilayer optical recording medium of the present invention only needs to be configured to include an N (N≥5) number of interfaces capable of reflecting the incident light.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF SYMBOLS 1, 20 multilayer optical recording medium
2 cover layer
3 selective reflection film
4 spacer
Lrc0 to Lrc9 recording film
5 substrate
sf surface
Ref reference surface
L0 to L9 interface
10 recording/reproduction light focus mechanism
11 fixed lens
12 movable lens
13 lens drive unit
14 mirror
15 dichroic prism
16 objective lens
17 biaxial actuator

The invention claimed is:

1. A multilayer optical recording medium, which includes an N number of interfaces capable of reflecting incident light, wherein the multilayer optical recording medium satisfies a condition that a difference $|S_{j\ to\ k} - S_{l\ to\ m}|$ between a total sum $S_{j\ to\ k}$ of a thickness of spacers formed between the interface Lj and the interface Lk and a total sum $S_{l\ to\ m}$ of a thickness of spacers formed between the interface Ll and the interface Lm is larger than $n\lambda/NA^2$, provided that each of an M number of interfaces selected from the N number of interfaces is defined as Li, and j<k≤l<m≤M is set, when light having a wavelength λ is collected to an objective lens having a numerical aperture NA with an interface Lj being a target, regarding an interface Lk, an interface Lm, and an interface Ll, which cause stray light due to three-times reflections via Lk or Ll to Lm to Ll or Lk, and the interface Lj, wherein $N \geq 5$, wherein $M \leq N$, wherein $i=0, 1, \ldots, M$, where, as a value of i becomes smaller, the layer in which the interface is formed becomes lower as viewed from an uppermost surface as a light incident surface, and wherein n is a refractive index of any of the spacers.

2. The multilayer optical recording medium according to claim 1, satisfying provided that a thickness of a spacer formed between an interface $L_{i-1}$ and an interface $L_i$ among the M number of interfaces is defined as $S_i$ ($i=1, 2, \ldots, M$), condition that a difference $|S_a - S_b|$ between thicknesses $S_a$ and $S_b$ ($1 \leq a \neq b \leq M$) of arbitrary two spacers is larger than $n\lambda/NA^2$.

3. The multilayer optical recording medium according to claim 1, wherein one interface of the interfaces is set to a reflection surface of a reflection film in which a position guide element is formed.

4. The multilayer optical recording medium according to claim 3, wherein the reflection film is configured to transmit therethrough light having a predetermined wavelength band and reflect light having a wavelength other than the predetermined wavelength band.

* * * * *